Feb. 12, 1929.  
J. M. REDINGER  
MILLING CUTTER  
Filed March 11, 1927
1,702,132
2 Sheets-Sheet 1
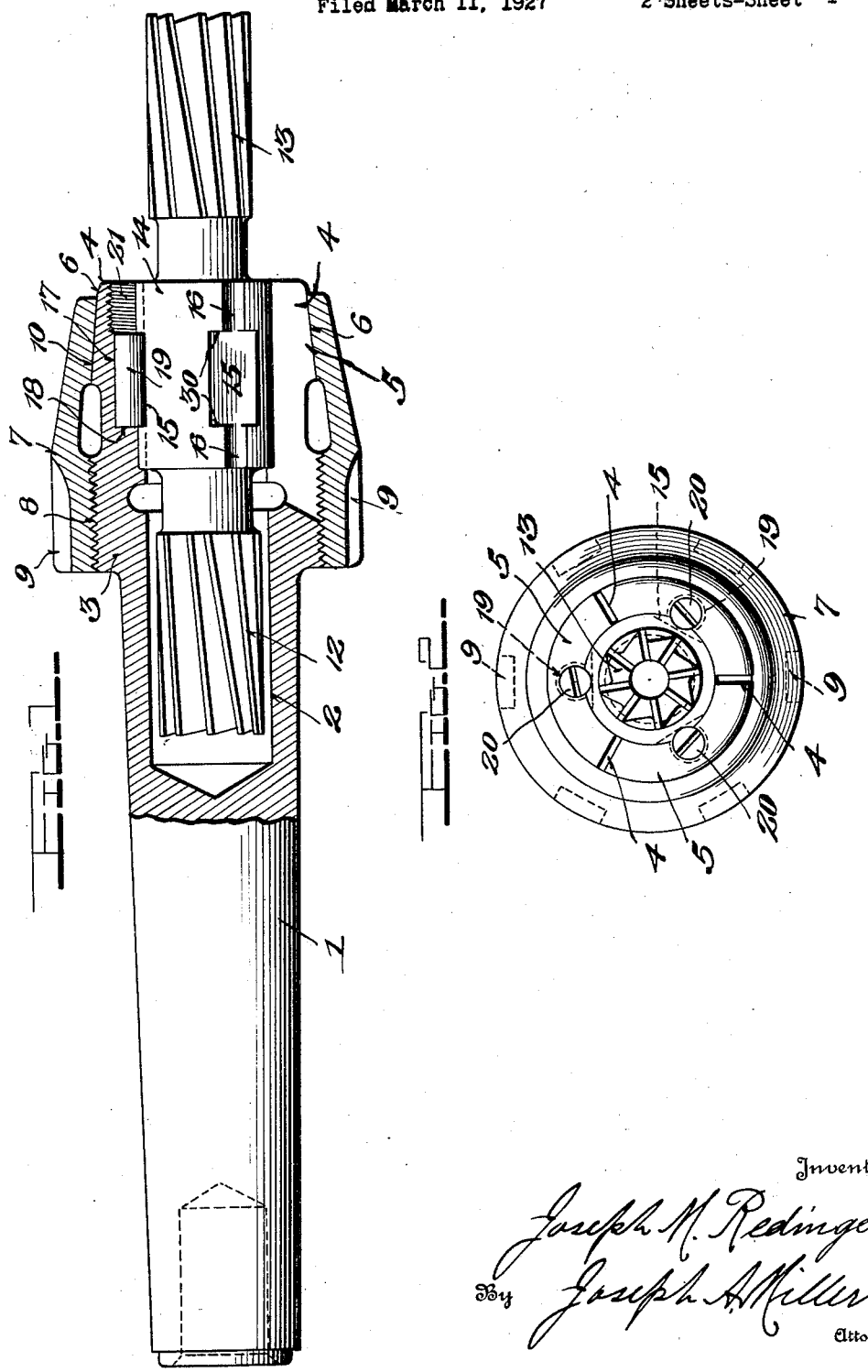
Inventor  
Joseph M. Redinger  
By Joseph A. Miller  
Attorney Feb. 12, 1929.
J. M. REDINGER
MILLING CUTTER
Filed March 11, 1927
1,702,132
2 Sheets-Sheet 2
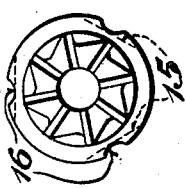
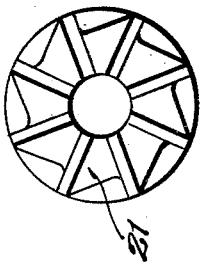
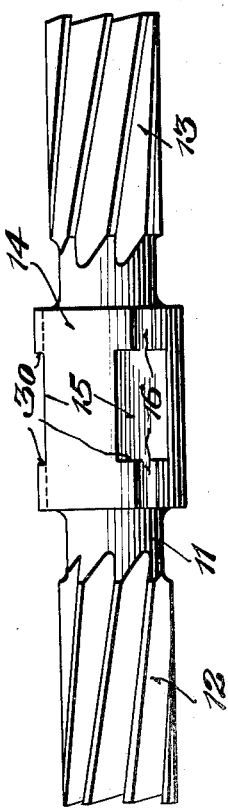
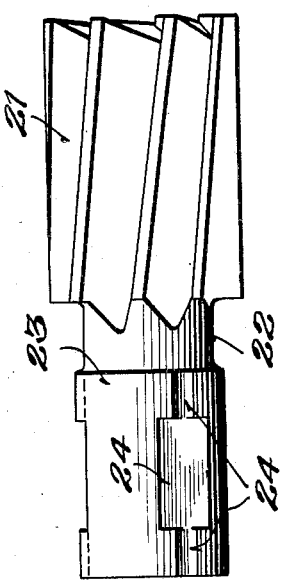
Inventor
Joseph M. Redinger
By Joseph A. Miller
Attorney Patented Feb. 12, 1929.

1,702,132

UNITED STATES PATENT OFFICE.

JOSEPH M. REDINGER, OF PROVIDENCE, RHODE ISLAND.

MILLING CUTTER.

Application filed March 11, 1927. Serial No. 174,671.

This invention relates to certain new and useful improvements in milling cutters, and relates more particularly to an improved holder therefor.

The primary object of the invention is to provide simple and improved means for effectively holding cutters and more particularly, large cutters, against rotation with respect to the holder, while still permitting the cutter to be easily and quickly removed and applied to the holder.

The invention further aims to provide a holder of this type wherein the cutter is positively locked to the holder at a plurality of points so as to effectively secure the cutter against rotation and to, at the same time, hold the cutter against endwise movement.

The invention still further aims to provide means of this character which is of simple and economical construction and devoid of parts likely to become deranged or otherwise rendered inoperative through use or wear.

In the drawings:—

Fig. 1 is a view partly in longitudinal section and side elevation of the invention;

Fig. 2, is a front end elevation of Fig. 1;

Fig. 3 is a side elevation of the cutter per se;

Fig. 4 is an end elevation of Fig. 3,

Fig. 5 is a side elevation of a single ended cutter;

Fig. 6 is a rear end elevation of Fig. 5, and

Fig. 7, is a front end elevation of Fig. 5.

In proceeding in accordance with the present invention, the holder or chuck embodies a shank 1 having a bore 2 at its front and a head 3. As shown in Fig. 2 the front end of the head is slotted at 4 to form a series of jaws 5 which latter are expansible and have bevelled or inclined outer faces 6. A holding sleeve 7 has threaded connection at its inner end at 8 with the head 3 and is formed with a series of wrench receiving cut-outs 9. The front end of the sleeve has a tapered bore 10 which conformably engages with the tapered peripheries of the jaws 4 whereby upon rotation of the sleeve, the jaws will be compressed and permitted to expand according to the direction of movement of the sleeve. In Figs. 1 and 3, a cutter of the double-ended type is shown and wherein a shank 11 is formed with cutters 12 and 13 on its outer ends, which cutters may be of the same or different type as desired. The shank 11 is provided with an intermediate enlarged portion 14 which latter is provided with as many flat faces 15 as there are jaws. The flat faces 15 are located intermediate of the ends of the central portions 14. Grooves 16 extend longitudinally of the portion 14 and are formed in the periphery of the latter and have their bottoms in substantial registration with the flat faces 15. The members 4 are formed with axial openings 17 that are located intermediate the ends of the jaws 4 and provide inner shoulder 18. Pins 19 are arranged in the openings 17 and abut the shoulders or inner ends 18 thereof. As is shown in Figs. 2 screws 20 are secured in the threaded outer ends 21 of the openings 17 so as to hold the pins 19 in the openings 17. In the modified form of the invention shown in Figures 5, 6 and 7, a single cutter 21 is shown formed on the front end of a shank 22, the rear end of which latter is provided with an enlarged portion 23 having flat faces 24 and grooves 25 which correspond to the flat faces 15 and grooves 16 shown and described in connection with the doubled ended cutter.

In operation, it will be seen that in applying the cutter in position, the sleeve 7 is rotated to move same forwardly and thereby release the jaws 4 so that the latter may relax or expand. The cutter is then inserted, its grooves 16 being brought into register with the pins 19, and by sliding the cutter inwardly and then turning same the parts will assume the position of Fig. 1 in which latter it will be noted that the pin ends will engage with the abutments or end walls 30 formed by the grooves 16, thus locking the cutter against endwise movement with respect to the pins 19, and since the latter are held by the end walls 18 and the screws 20, it will be noted that the cutter and pin are both held against endwise movement with respect to the head 3. The sleeve 7 is now rotated so as to move rearwardly of the head, causing the jaws 4 to be compressed and positively lock the parts in position. To release the parts, it is merely necessary to relax the jaw 4 whereupon the cutter can be slightly turned to release the pins from engagement with the walls 30 and to then bring the pins in register with the grooves 16 whereupon the cutter can be slid out of its holder.

It will be seen that the sides of the openings 17 which communicate with the bore of the head are of less width than the greatest diameters of the openings 17 so that the pins 19 are held against movement out of the openings 17.

The operation in the single-ended type shown in Figs. 5, 6 and 7 is identical with that above described. However, in the double ended type, it will be noted that the cutter can be easily reversed so as to bring either end 12 or 13 into cutting position, as may be desired.

From the foregoing, it will be seen that the pin ends present projections which are slidable in the space between the opposed pairs of abutments 30 that are provided by virtue of the grooves, and wherein, upon turning of the cutter, one of the pairs of abutments is engaged with the pin ends, thus holding the cutter against longitudinal movement. Thus, regardless of whether the cutter is turned clockwise or counterclockwise, a pair of its abutments will be engaged with the pin ends.

Having thus described my invention what I claim is new and desire to secure by Letters Patent is:—

1. In combination with a cutter having an enlarged circular part of uniform diameter formed with a series of flat portions on its periphery disposed between the ends of the enlarged part and having grooves extending from the centers of one of the ends of the flat portions to the adjacent end of the enlarged part to form abutments on each side of each of the grooves, a holder having jaws formed with longitudinal grooves for registry with the flat portions and first named grooves, said jaw grooves having inner end walls, a pin in each jaw groove of substantially the same length as that of the flat portions, a screw in the outer end of each jaw groove to hold the pin therein, and means to clamp the jaws against the enlarged part and thereby clamp the pins against said flat portions, said flat portions being formed so as to permit the cutter to be turned thereby to cause the pin ends to engage the abutments so as to hold the cutter against longitudinal movement.

2. In combination with a cutter having a part formed with a flat face disposed between the ends of the said part, and having a groove leading from one end of the flat face to form abutments and extending to the adjacent end of said part, a holder having jaws one of which is fromed with a longitudinal groove, a pin in the jaw groove of substantially the same length as that of the flat face, means to hold the pin in the groove, and means to clamp the jaws against the enlarged part and thereby clamp the pin against the flat face, the cutter being rotatable in the holder whereby upon rotation to cause the abutments to engage the pin ends thereby to prevent longitudinal movement of the cutter.

3. In combination with a cutter having abutments spaced longitudinally and circumferentially of the cutter, a holder having jaws, a member on one of the jaws extending longitudinally thereof and beyond the inner face of the jaw and having ends engageable in the longitudinal space between the abutments and with the latter, said cutter having a groove in register with the circumferential space between the abutments and formed to receive the member whereby to permit the cutter to be slid into the holder and then turned to cause the ends of the member to engage the abutments on one side of the groove so as to hold the cutter against longitudinal movement, and means to clamp the member against the cutter.

4. In combination with a cutter having an axial cutaway part and a groove extending longitudinally of the cutter and a pair of spaced abutments to one side of the groove and disposed at the respective ends of the cutaway part, a holder having a longitudinal groove adapted to register with said cutaway part, a pin slidably receivable in said holder groove and being of a length to have its ends engage said abutments upon relative turning of the cutter, and means independent of the pin to clamp the pin between the holder and cutter and against the cutter.

5. In combination with a cutter having an axial cutaway part and a groove extending longitudinally of the cutter and a pair of spaced abutments to one side of the groove and disposed at the respective ends of the cutaway part, a holder, a member slidable in said groove and extending axially of the holder and of a length substantially equal to that of the cutaway part and adapted to register with the latter and to have its ends engage said abutments upon relative turning of the cutter and holder, and means independent of the member to clamp said member between the holder and cutter and against the cutter.

6. In combination with a cutter having an axial cutaway part and an abutment at each end of the cutaway part, a holder, a member of substantially the length of the cutway part, carried by the holder and disposed axially of the cutter and having its ends engageable with the respective abutments, and means independent of the member to clamp the member between the holder and cutter and against the cutter.

In testimony whereof I have signed my named to this specification.

JOSEPH M. REDINGER.